(12) United States Patent
Chang et al.

(10) Patent No.: US 12,271,237 B2
(45) Date of Patent: Apr. 8, 2025

(54) FOLDABLE ELECTRONIC DEVICE

(71) Applicant: ASUSTeK COMPUTER INC., Taipei (TW)

(72) Inventors: Chih-Han Chang, Taipei (TW); Tsung-Ju Chiang, Taipei (TW); Chi-Hung Lin, Taipei (TW); Yen-Ting Liu, Taipei (TW)

(73) Assignee: ASUSTek COMPUTER INC., Taipei (TW)

( * ) Notice: Subject to any disclaimer, the term of this patent is extended or adjusted under 35 U.S.C. 154(b) by 230 days.

(21) Appl. No.: 18/307,795

(22) Filed: Apr. 27, 2023

(65) Prior Publication Data
US 2024/0077914 A1    Mar. 7, 2024

(30) Foreign Application Priority Data

Sep. 2, 2022 (TW) .................................. 111209575

(51) Int. Cl.
G06F 1/16 (2006.01)

(52) U.S. Cl.
CPC .......... G06F 1/1681 (2013.01); G06F 1/1616 (2013.01)

(58) Field of Classification Search
CPC combination set(s) only.
See application file for complete search history.

(56) References Cited

U.S. PATENT DOCUMENTS

| | | | | |
|---|---|---|---|---|
| 7,561,420 B2* | 7/2009 | Chueh | ................... | G06F 1/1656 361/679.55 |
| 10,296,048 B1* | 5/2019 | Wang | ................... | G06F 1/1654 |
| 10,837,209 B2* | 11/2020 | Lin | ................... | G06F 1/1681 |
| 11,259,428 B2* | 2/2022 | Kang | ................... | H05K 5/0017 |
| 11,334,122 B2* | 5/2022 | Hsu | ................... | E05D 11/082 |
| 11,543,854 B2* | 1/2023 | Park | ................... | G06F 1/1681 |
| 11,762,433 B2* | 9/2023 | Kim | ................... | G06F 1/1652 361/679.01 |
| 11,832,405 B2* | 11/2023 | Zhang | ................... | F16C 11/04 |
| 11,846,987 B2* | 12/2023 | Chen | ................... | G06F 1/1616 |
| 12,066,858 B2* | 8/2024 | Park | ................... | G06F 1/1618 |
| 12,066,871 B2* | 8/2024 | Huang | ................... | F16C 11/04 |
| 2020/0256099 A1* | 8/2020 | Lin | ................... | E05D 7/0009 |
| 2021/0026407 A1* | 1/2021 | Park | ................... | G06F 1/1616 |

(Continued)

FOREIGN PATENT DOCUMENTS

| | | |
|---|---|---|
| CN | 108716509 | 10/2018 |
| CN | 111288072 | 8/2021 |

*Primary Examiner* — Lisa Lea-Edmonds
(74) *Attorney, Agent, or Firm* — JCIPRNET

(57) ABSTRACT

A foldable electronic device includes a first body having an end and a first inclined surface, a second body having a second inclined surface, and a hinge module. The end includes an accommodating area. A virtual shaft line exists between sides of the first inclined surface and the second inclined surface that are closest to each other. The second body rotates relative to the first body through the virtual shaft line. The hinge module includes a first bracket adjacent to the first inclined surface, connected to the first body, and located in the accommodating area, a second bracket adjacent to the second inclined surface and connected to the second body, and a third bracket including a first end and a second end. The first bracket is connected to the first end through a first torsion assembly. The second bracket is connected to the second end through a second torsion assembly.

12 Claims, 16 Drawing Sheets

(56) References Cited

U.S. PATENT DOCUMENTS

| | | | |
|---|---|---|---|
| 2023/0195166 A1* | 6/2023 | Chen | G06F 1/1681 |
| | | | 361/679.27 |
| 2023/0205281 A1* | 6/2023 | Kim | H04M 1/0216 |
| | | | 361/679.01 |
| 2023/0229202 A1* | 7/2023 | Huang | G06F 1/1681 |
| | | | 361/679.55 |
| 2024/0077914 A1* | 3/2024 | Chang | G06F 1/1681 |

* cited by examiner

FOLDABLE ELECTRONIC DEVICE

CROSS-REFERENCE TO RELATED APPLICATION

This application claims the priority benefit of Taiwan application serial no. 111209575, filed on Sep. 2, 2022. The entirety of the above-mentioned patent application is hereby incorporated by reference herein and made a part of this specification.

BACKGROUND

Technical Field

The disclosure relates to an electronic device, and more particularly, to a foldable electronic device.

Description of Related Art

In existing foldable electronic devices, two bodies (such as a screen and a host) are often pivoted to each other through a hinge module. In addition, in order to allow the two bodies to unfold 180 degrees relative to each other, the structure of the hinge module not only affects the thickness and aesthetics of the two bodies, but also causes the problem of the excessive gap between the two bodies, or even increase the number of parts and cost of the hinge module itself.

SUMMARY

The disclosure provides a foldable electronic device, which includes a first body, a second body, and a hinge module. The first body has an end and a first inclined surface. The end includes an accommodating area. The second body has a second inclined surface. A virtual shaft line exists between the sides of the first inclined surface and the second inclined surface that are closest to each other. The second body rotates relative to the first body through the virtual shaft line. The hinge module includes a first bracket, a second bracket, and a third bracket. The first bracket is adjacent to the first inclined surface, connected to the first body, and located in the accommodating area. The second bracket is adjacent to the second inclined surface and connected to the second body. The third bracket includes a first end and a second end that are opposite to each other. The first bracket is connected to the first end through a first torsion assembly. The second bracket is connected to the second end through a second torsion assembly. When the second body is unfolded relative to the first body, the second bracket rotates relative to the third bracket along the virtual shaft line, and the third bracket rotates relative to the first bracket along the virtual shaft line.

Based on the above, in the foldable electronic device of the disclosure, the hinge module is connected between the first body and the second body, and the virtual shaft line is located between the sides of the first inclined surface and the second inclined surface that are closest to each other, so that when the second body is unfolded to any angle relative to the first body, the size of the gap between the first body and the second body is consistent to present a simple and neat appearance, thereby improving the overall appearance and texture of the foldable electronic device.

In addition, through the two-stage rotation of the second bracket relative to the third bracket along the virtual shaft line and the third bracket relative to the first bracket along the virtual shaft line in the hinge module, the volume required by the hinge module during the rotating action can be reduced, the number of parts and the cost of the hinge module can also be relatively simplified, and the accommodating area required by the hinge module in the first body is greatly reduced, thereby reducing the overall thickness of the foldable electronic device.

DESCRIPTION OF THE EMBODIMENTS

Figure 1A:
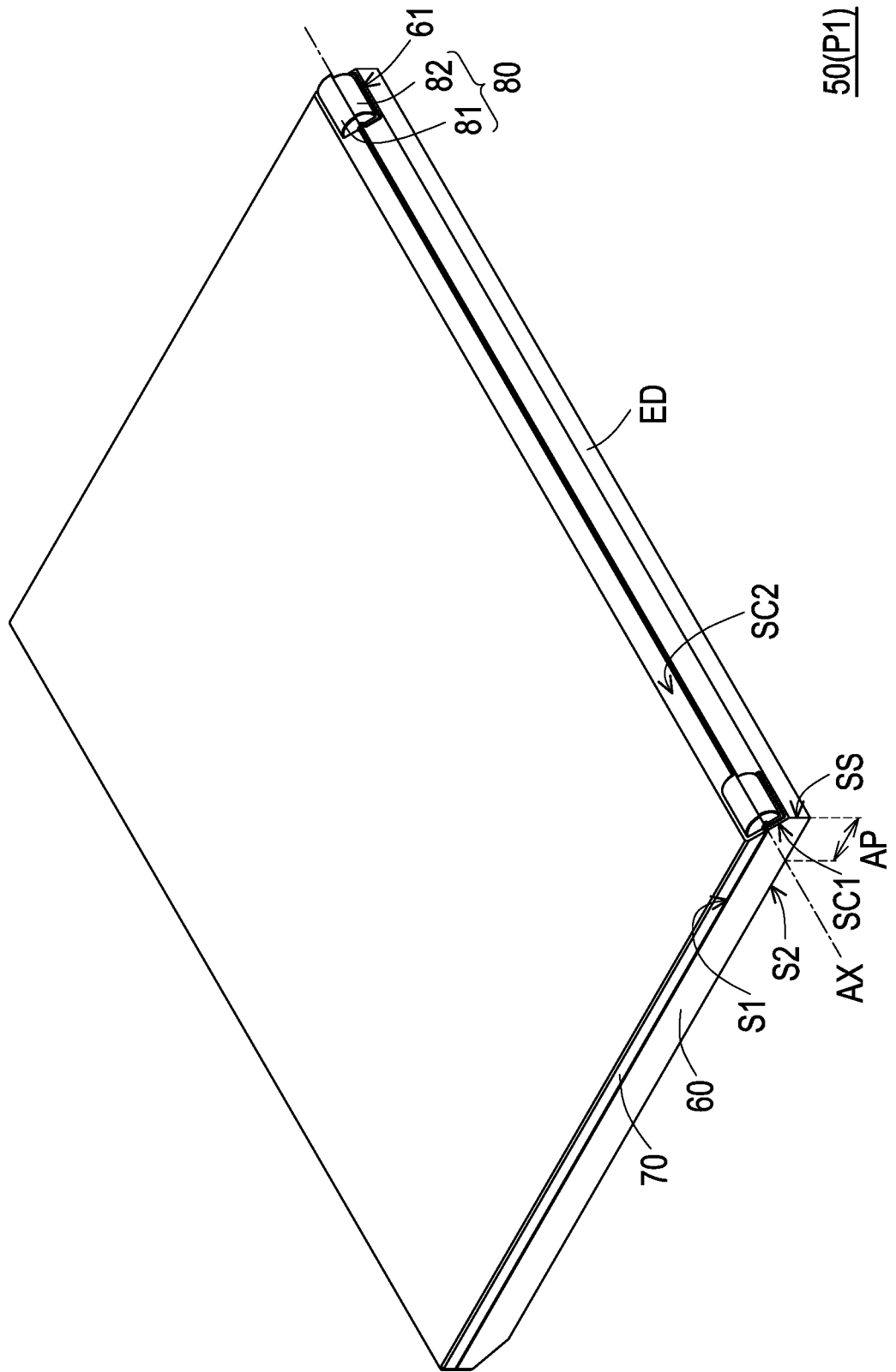
FIGS. 1A to 1C are perspective views of a foldable electronic device in a first position, an intermediate position, and a second position according to an embodiment of the disclosure.
Figure 1B:
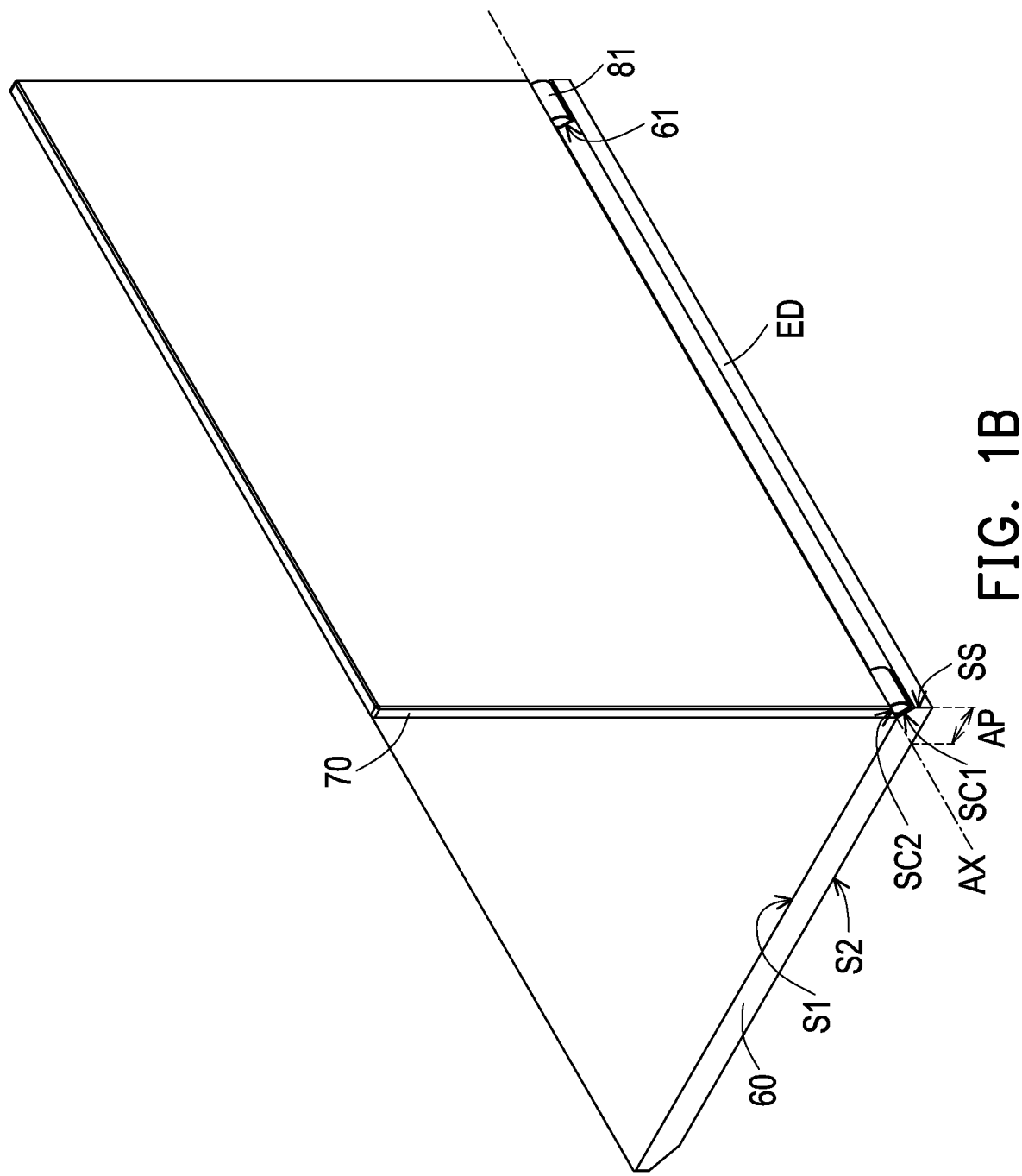
Figure 1C:
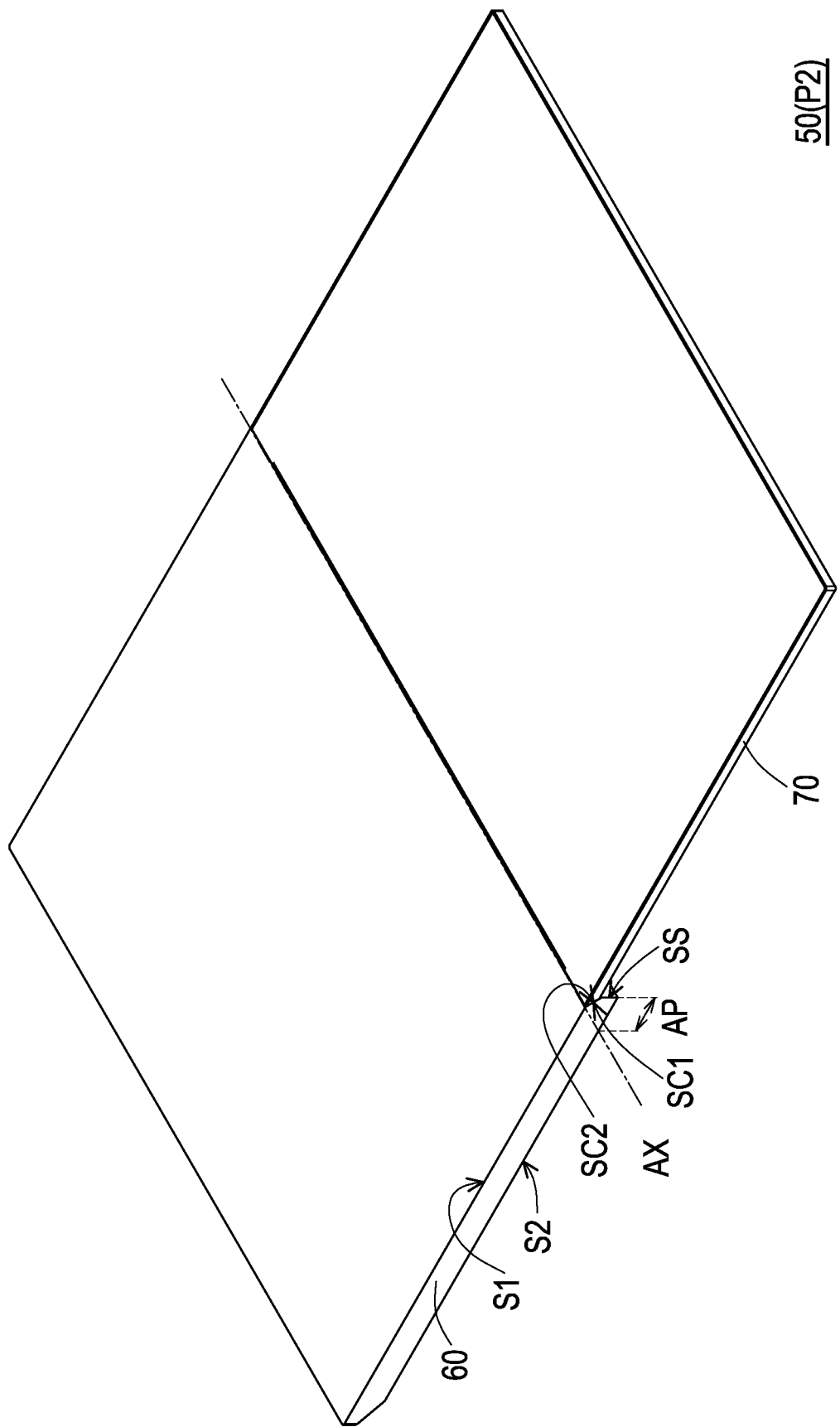

FIGS. 1A to 1C are perspective views of a foldable electronic device 50 in a first position P1, an intermediate position PC, and a second position P2 according to an embodiment of the disclosure.

Referring to FIGS. 1A to 1C, the foldable electronic device 50 of the embodiment includes a first body 60, a second body 70, and a hinge module 100 (FIGS. 2A to 6B). The first body 60 has an end ED (FIGS. 1A and 1B) and a first inclined surface SC1, the second body 70 has a second inclined surface SC2, and the first inclined surface SC1 corresponds to the second inclined surface SC2. The end ED of the first body 60 (FIGS. 1A and 1B) includes an accommodating area AP.

In an embodiment, the first body 60 is, for example, a logic host, and the second body 70 is, for example, a display body, but not limited thereto.

Figure 3A:
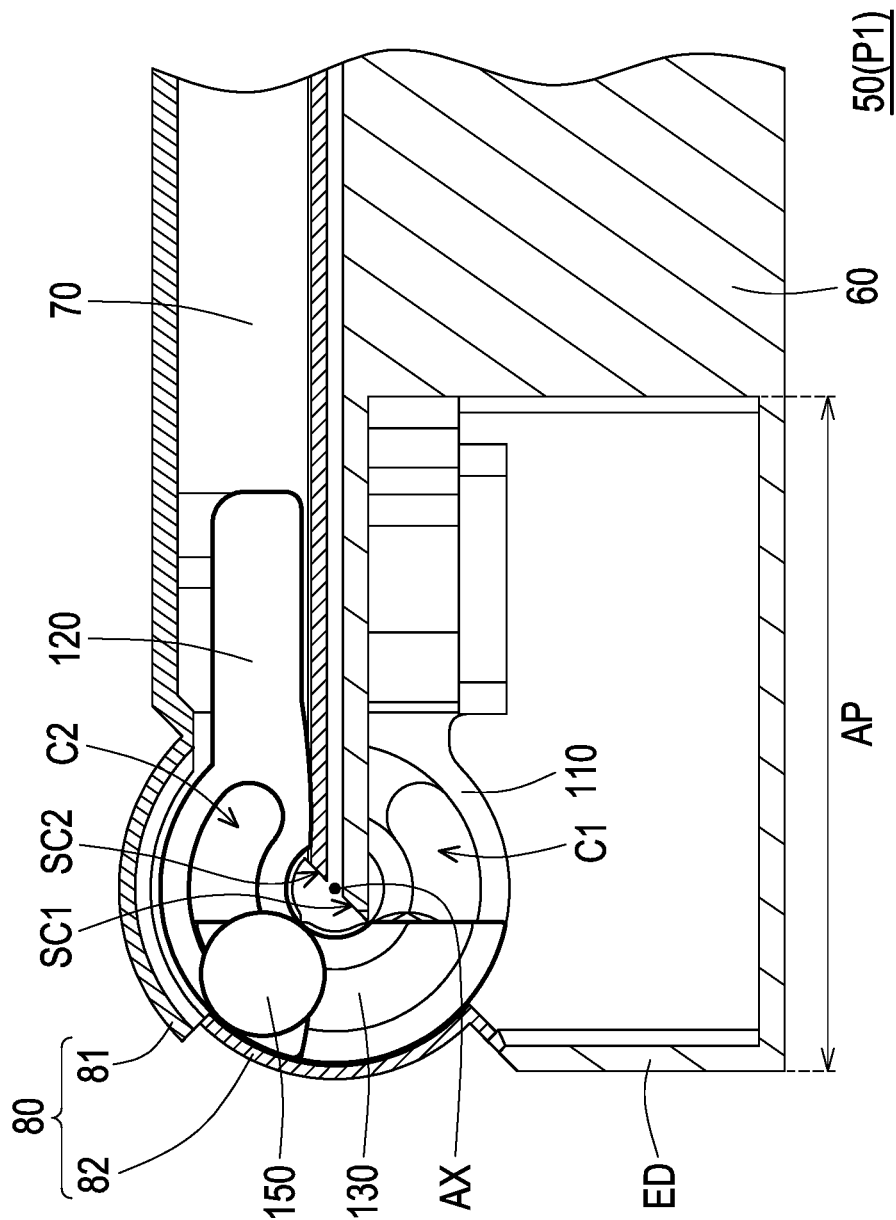
FIG. 3A is a partial side cross-sectional view of FIG. 1A.
Figure 4A:
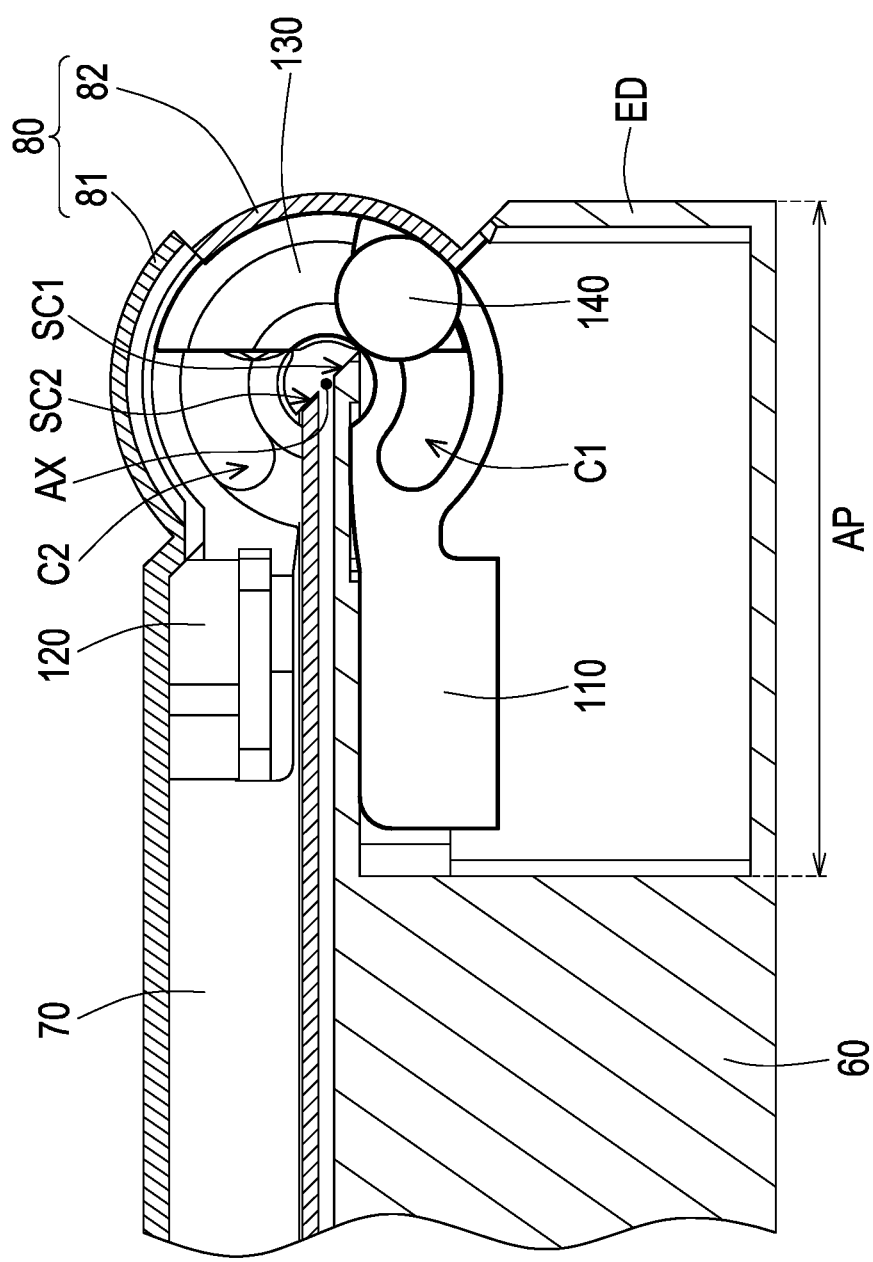
FIG. 4A is a partial side cross-sectional view from another perspective of FIG. 3A.

In an embodiment, as shown in FIGS. 3A and 4A, when the second body 70 is closed to the first body 60 (at the first position P1), the first inclined surface SC1 and the second inclined surface SC2 are coplanar.

Figure 3B:
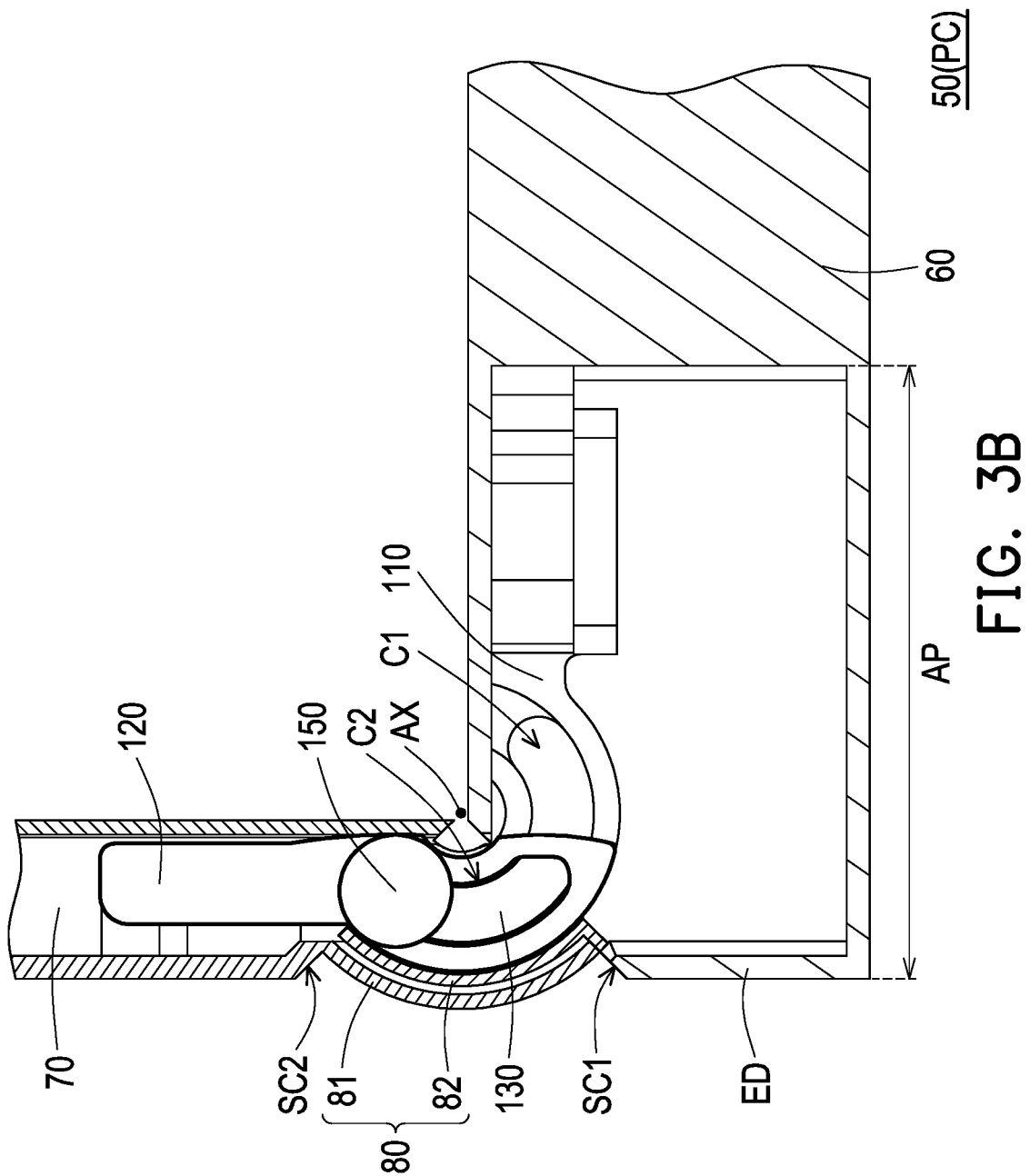
FIG. 3B is a partial side cross-sectional view of FIG. 1B.
Figure 3C:
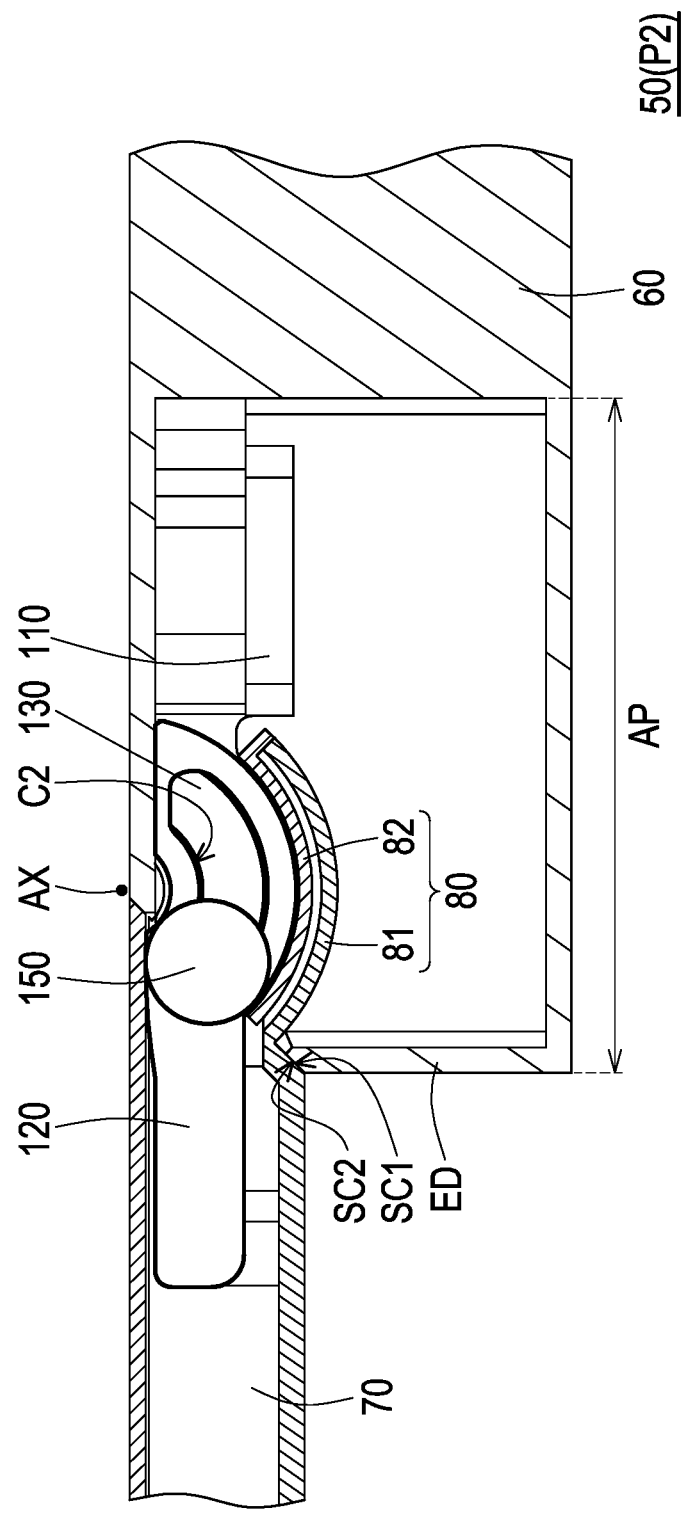
FIG. 3C is a partial side cross-sectional view of FIG. 1C.
Figure 4B:
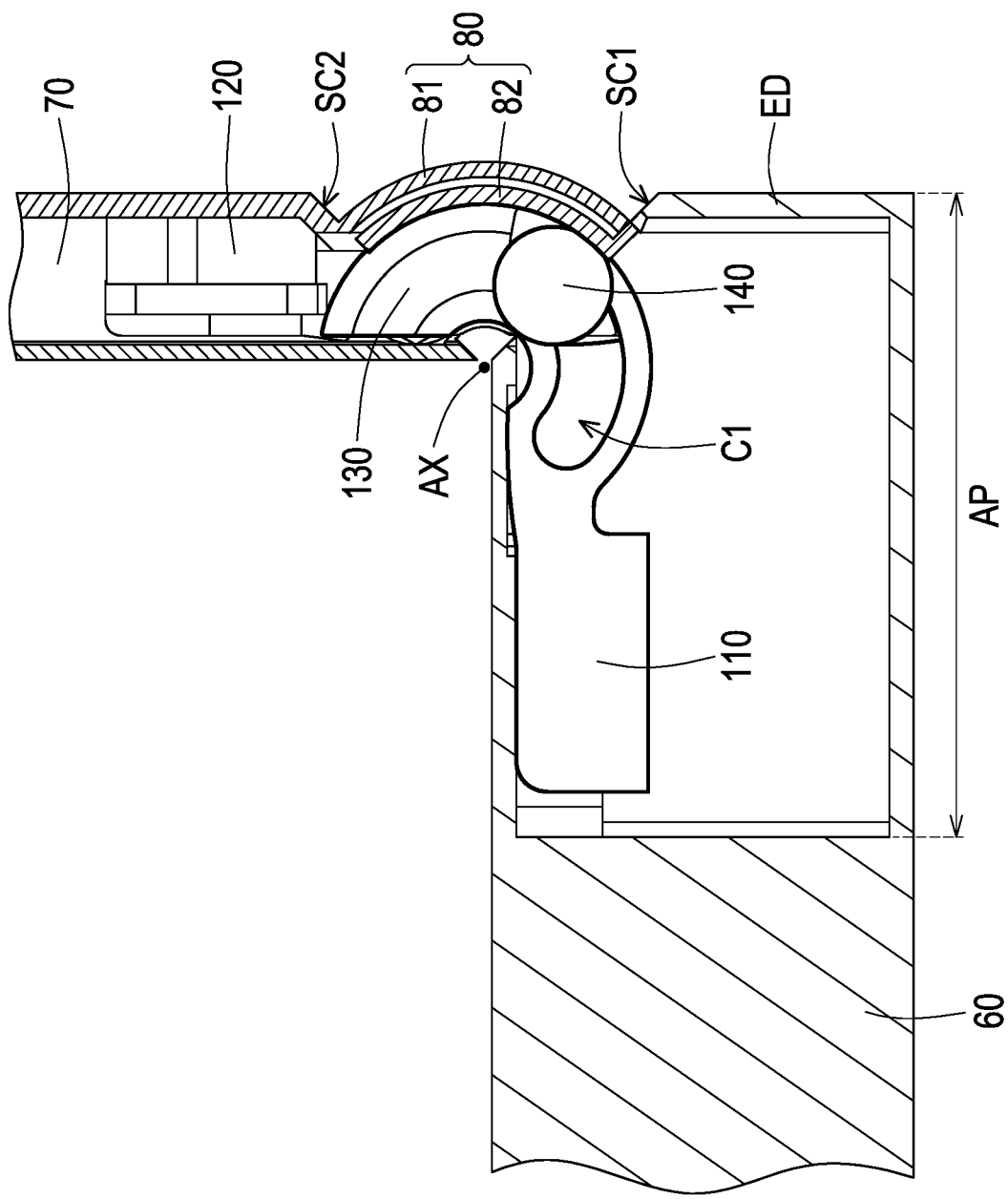
FIG. 4B is a partial side cross-sectional view from another perspective of FIG. 3B.
Figure 4C:
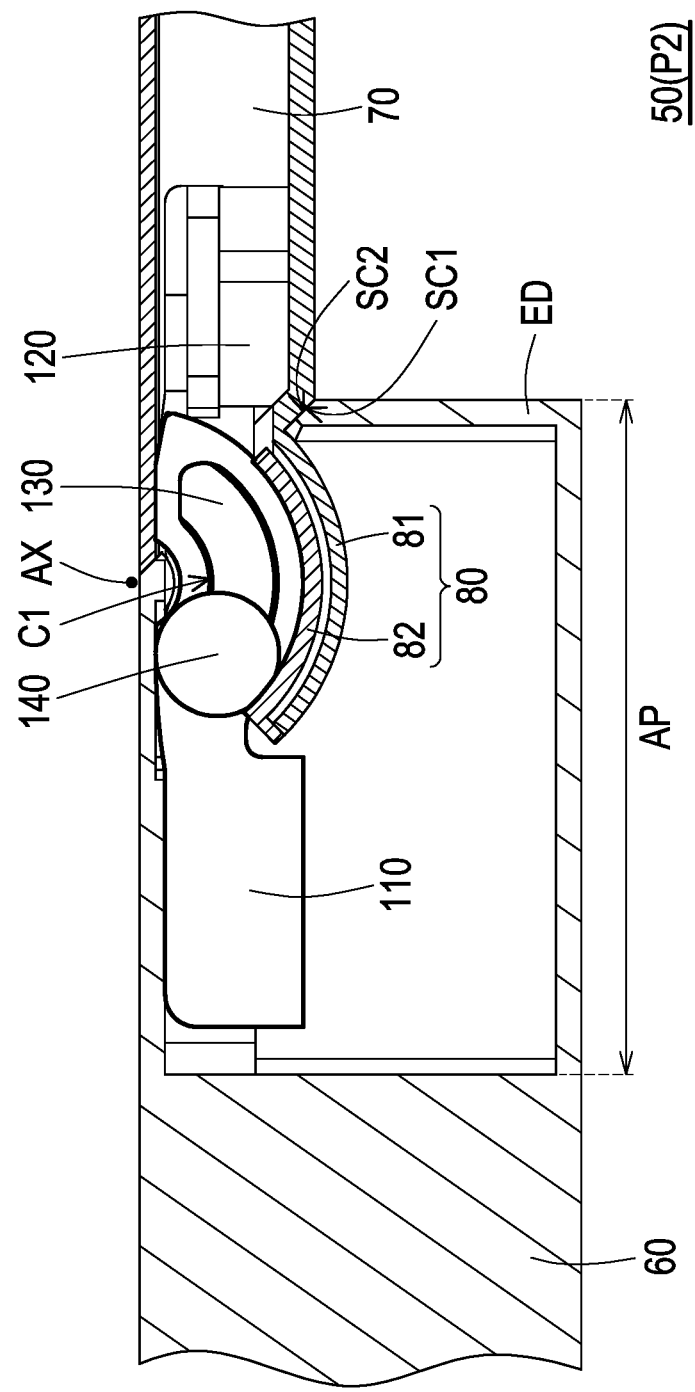
FIG. 4C is a partial side cross-sectional view from another perspective of FIG. 3C.
Figure 5A:
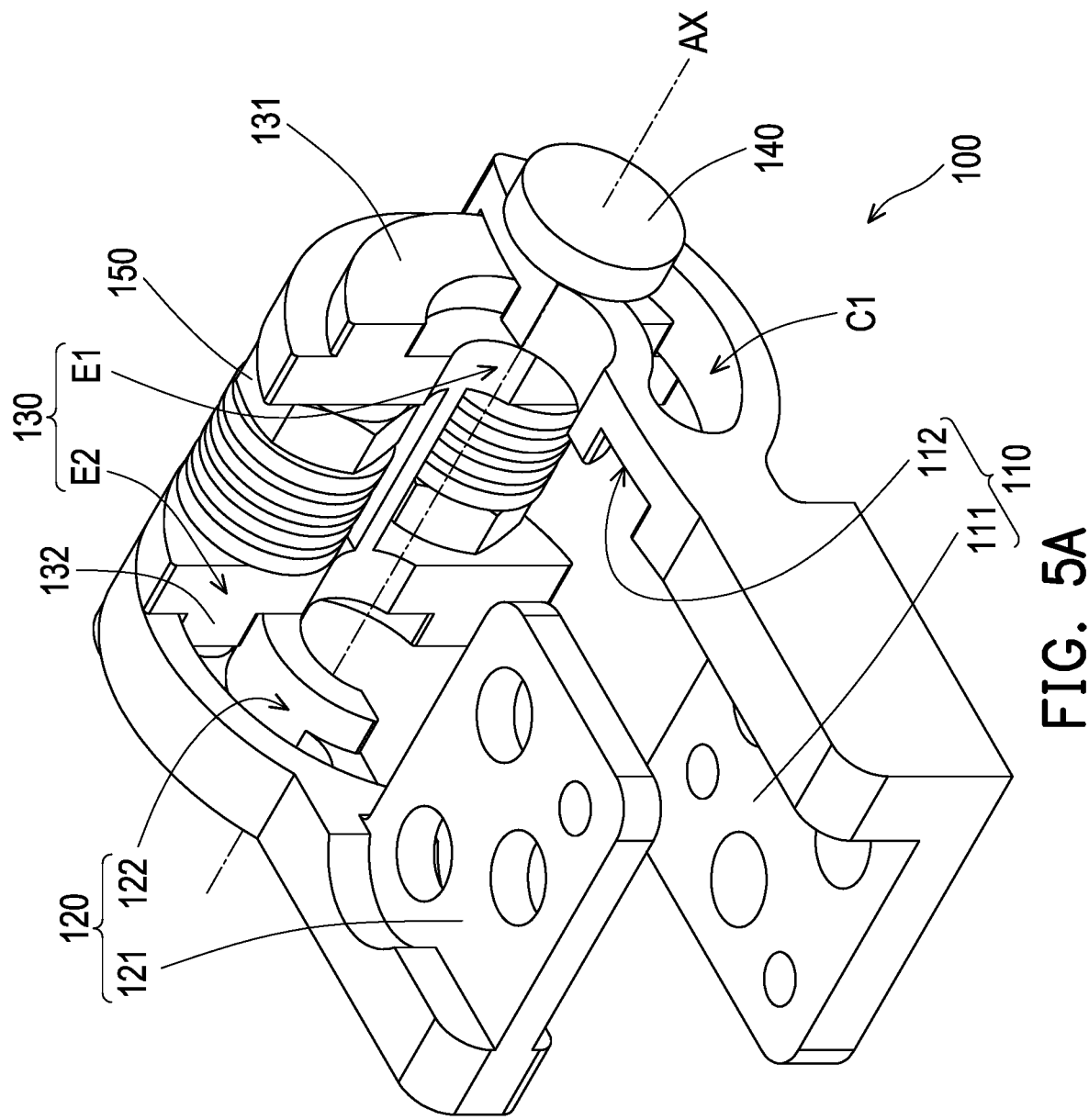
FIGS. 5A and 5B are perspective views of the hinge module of FIG. 2A.
Figure 5B:
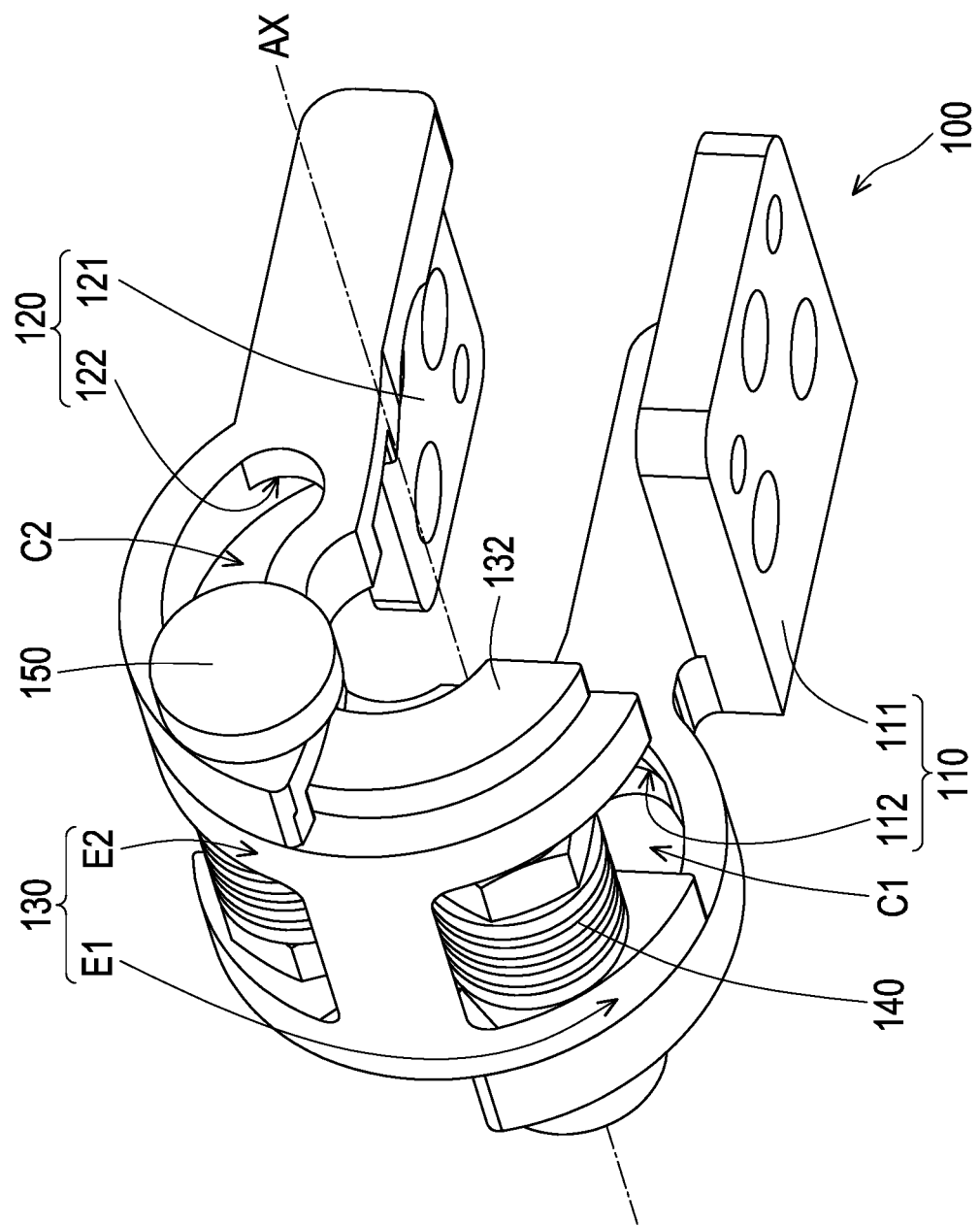

In an embodiment, as shown in FIGS. 3C and 4C, when the second body 70 is unfolded relative to the first body 60 (at the second position P2), the second inclined surface SC2 is attached to the first inclined surface SC1.

Referring to FIGS. 3A to 4C, the hinge module 100 is connected between the first body 60 and the second body 70, so that the second body 70 rotates 180 degrees relative to the first body 60 through a virtual shaft line AX. Here, the virtual shaft line AX is located between the sides of the first inclined surface SC1 and the second inclined surface SC2 that are closest to each other.

Figure 2A:
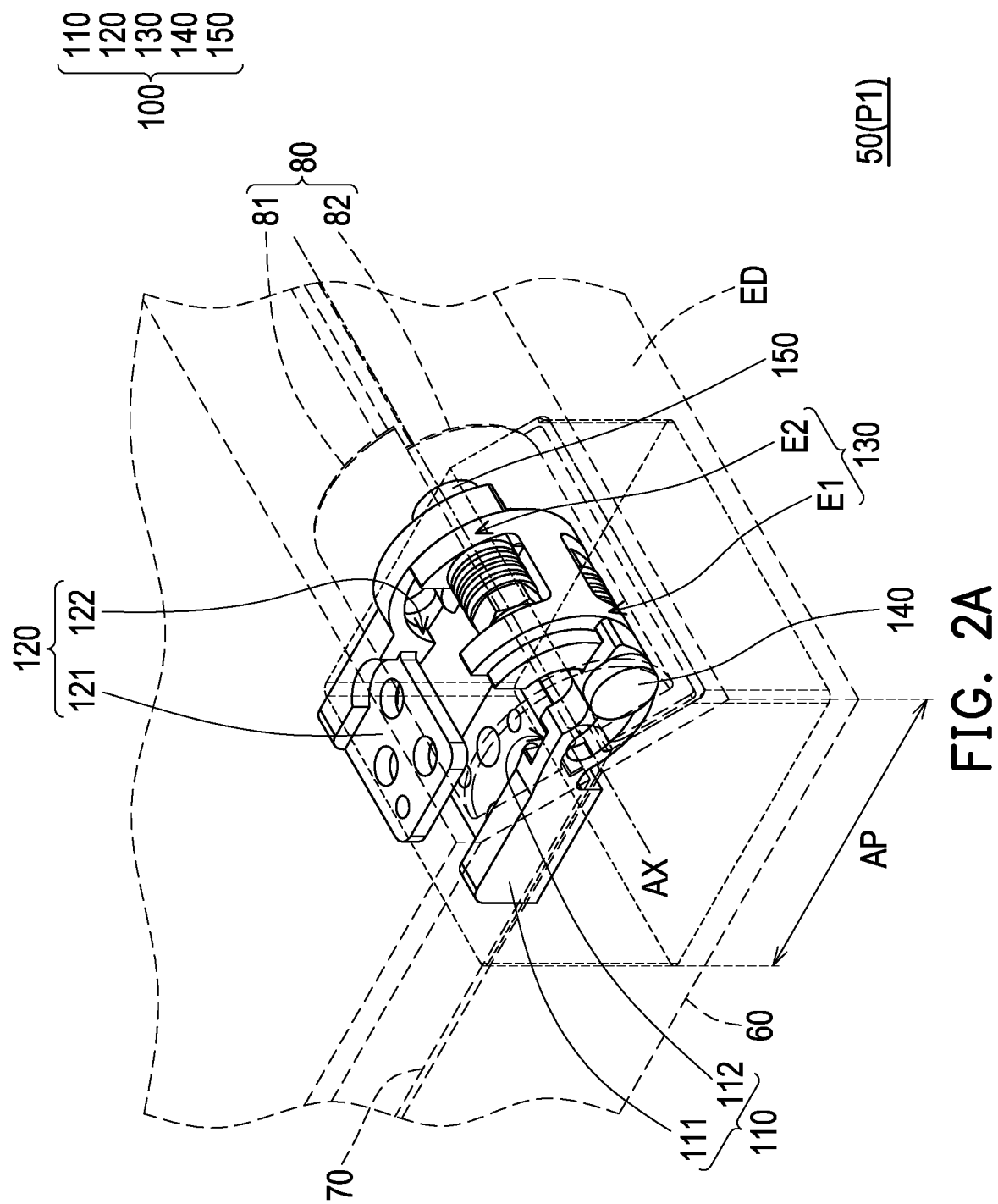
FIG. 2A is a partial enlarged perspective view of FIG. 1A.
Figure 2B:
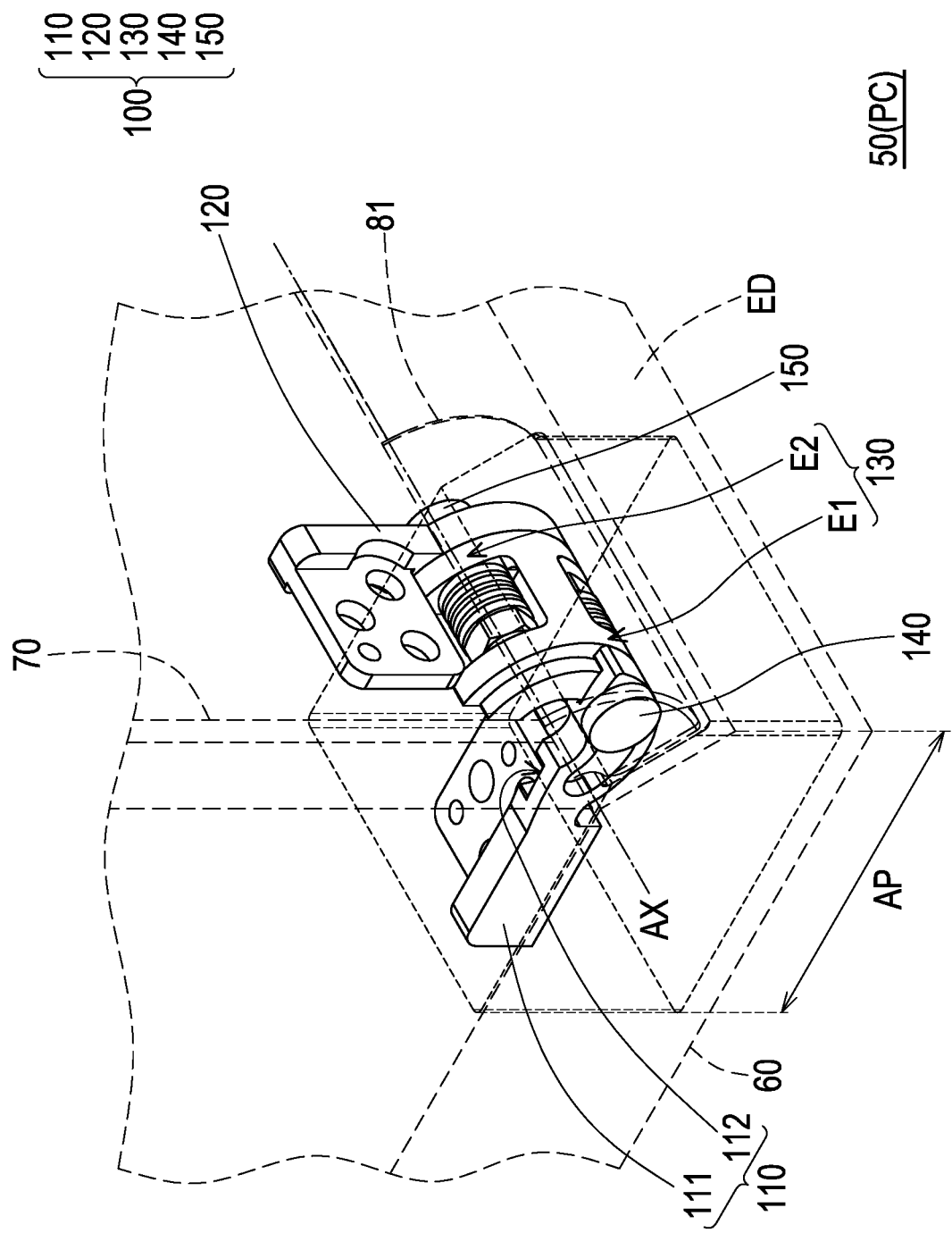
FIG. 2B is a partial enlarged perspective view of FIG. 1B.
Figure 2C:
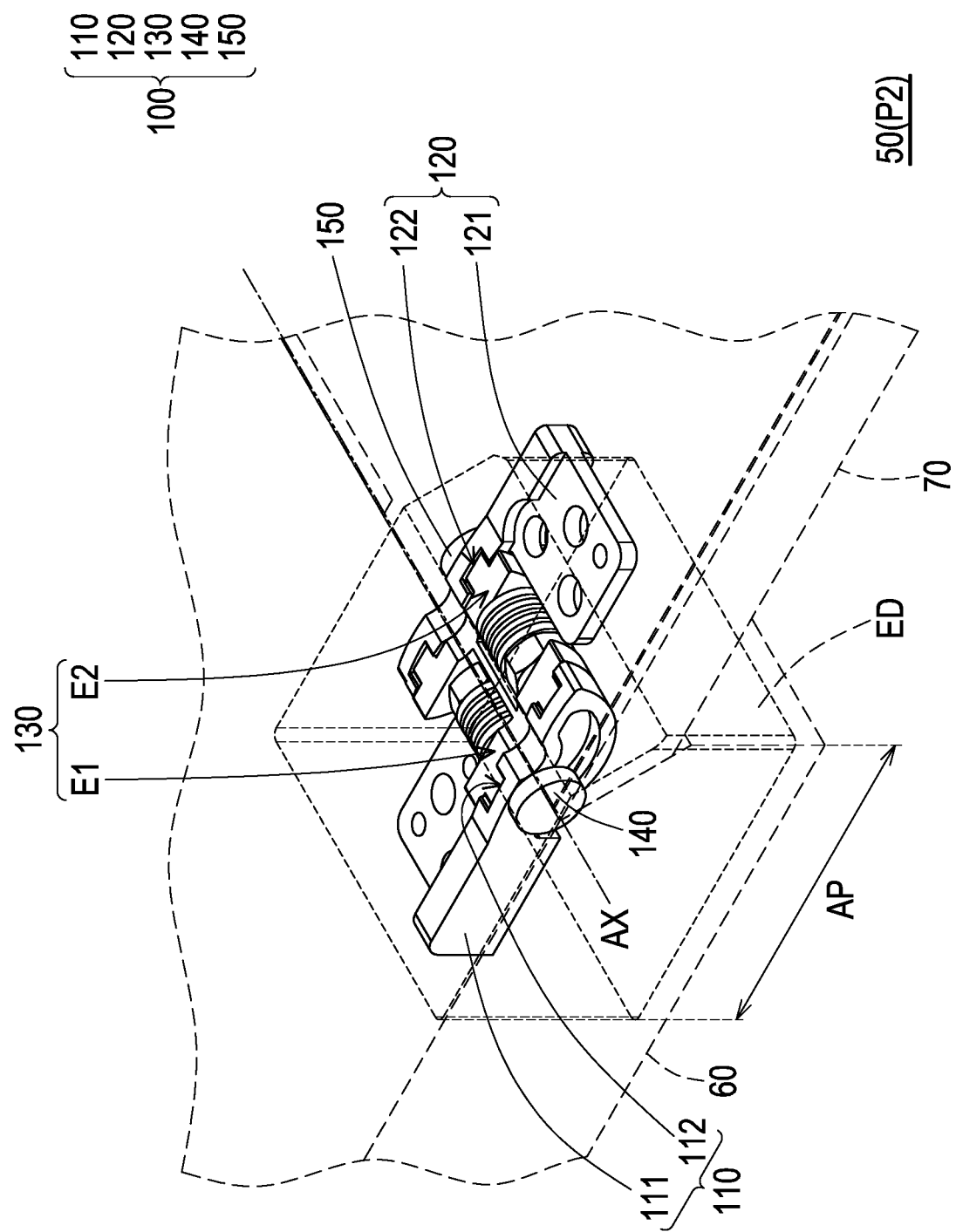
FIG. 2C is a partial enlarged perspective view of the foldable electronic device of FIG. 1C omitting the casing assembly.

Referring to FIGS. 2A to 2C, the hinge module 100 includes a first bracket 110, a second bracket 120, and a third bracket 130. The first bracket 110 is adjacent to the first inclined surface SC1, connected to the first body 60, and located in the accommodating area AP. The second bracket 120 is adjacent to the second inclined surface SC2 and connected to the second body 70. The third bracket 130 includes a first end E1 and a second end E2 that are opposite to each other. The first bracket 110 is connected to the first end E1 through a first torsion assembly 140, and the second bracket 120 is connected to the second end E2 through a second torsion assembly 150.

In an embodiment, as shown in FIGS. 4A to 4C, the orthographic projection of the second inclined surface SC2 on the first body 60 is located in the accommodating area AP. In an embodiment, as shown in FIGS. 1A to 1C, the first body 60 has a side surface SS, a first surface S1, and a second surface S2, and the first surface S1 is opposite to the second surface S2. The first surface S1 is close to the second body 70, the second surface S2 is far from the second body 70, the first inclined surface SC1 is connected obliquely between the first surface S1 and the side surface SS, and the side surface SS is connected between the first inclined surface SC1 and the second surface S2. When the second body 70 is unfolded relative to the first body 60 until the second inclined surface SC2 is attached to the first inclined surface SC1 (i.e., at the second position P2), the hot air of the first body 60 flows from the side surface SS to avoid damage to the body caused by direct blowing of the hot air from the first body 60 to the second body 70.

Referring to FIGS. 5A to 6B, the first bracket 110 includes a first fixing portion 111 and a first sliding portion 112 that are connected to each other, and the second bracket 120 includes a second fixing portion 121 and a second sliding portion 122 that are connected to each other. The first end E1 of the third bracket 130 includes a third sliding portion 131 corresponding to the first sliding portion 112, and the second end E2 of the third bracket 130 includes a fourth sliding portion 132 corresponding to the second sliding portion 122.

The first bracket 110 is connected to the first body 60 through the first fixing portion 111 (FIGS. 2A to 2C), and the second bracket 120 is connected to the second body 70 through the second fixing portion 121 (FIGS. 2A and 2C). The first sliding portion 112 and the third sliding portion 131 are slidably disposed with respect to each other along the virtual shaft line AX, and the second sliding portion 122 and the fourth sliding portion 132 are slidably disposed with respect to each other along the virtual shaft line AX.

In an embodiment, the first sliding portion 112 is, for example, one of a convex portion and a concave portion, the third sliding portion 131 is, for example, the other of the convex portion and the concave portion, the second sliding portion 122 is, for example, one of the convex portion and the concave portion, and the fourth sliding portion 132 is, for example, the other of the convex portion and the concave portion, but not limited thereto.

In an embodiment, the first sliding portion 112, the second sliding portion 122, the third sliding portion 131, and the fourth sliding portion 132 are arc-shaped and are concentrically disposed on the virtual shaft line AX.

Referring to FIGS. 5A to 6B, the first sliding portion 112 has a first arc-shaped slide rail C1, the second sliding portion 122 has a second arc-shaped slide rail C2, and the first arc-shaped slide rail C1 and the second arc-shaped slide rail C2 are concentrically disposed on the virtual shaft line AX. The first torsion assembly 140 is slidably disposed on the first arc-shaped slide rail C1, and the second torsion assembly 150 is slidably disposed on the second arc-shaped slide rail C2. Here, through the structural design of the first arc-shaped slide rail C1 and the second arc-shaped slide rail C2, the sliding strokes of the first torsion assembly 140 and the second torsion assembly 150 may be restricted on the first arc-shaped slide rail C1 and the second arc-shaped slide rail C2, respectively, thereby controlling the rotation angle of the second bracket 120 relative to the third bracket 130 and the rotation angle of the third bracket 130 relative to the first bracket 110.

In an embodiment, the rotation angle of the second bracket 120 relative to the third bracket 130 and the rotation angle of the third bracket 130 relative to the first bracket 110 are, for example, 90 degrees, respectively.

Figure 6A:
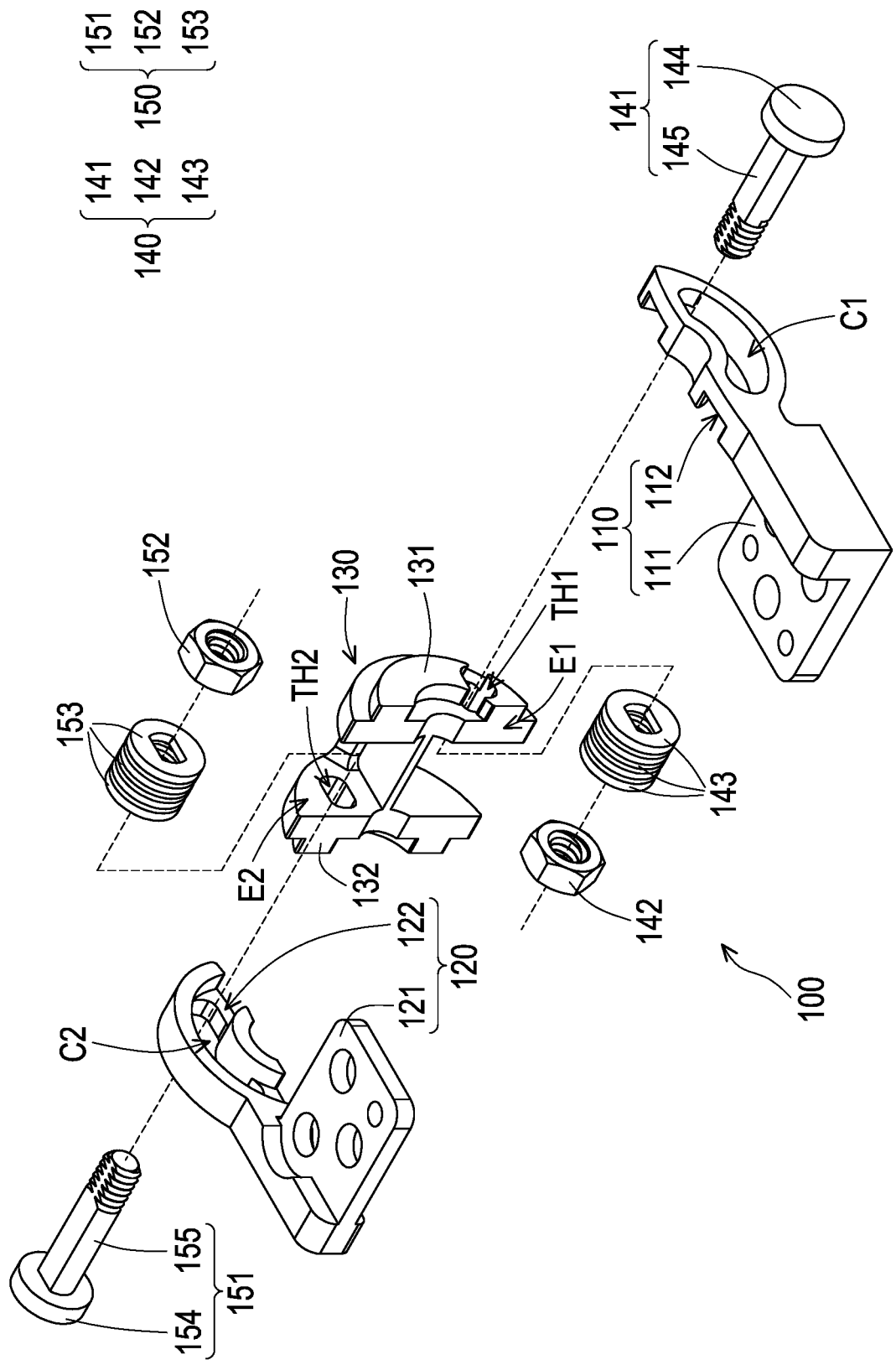
FIGS. 6A and 6B are exploded views of parts of the hinge module of FIG. 2A.
Figure 6B:
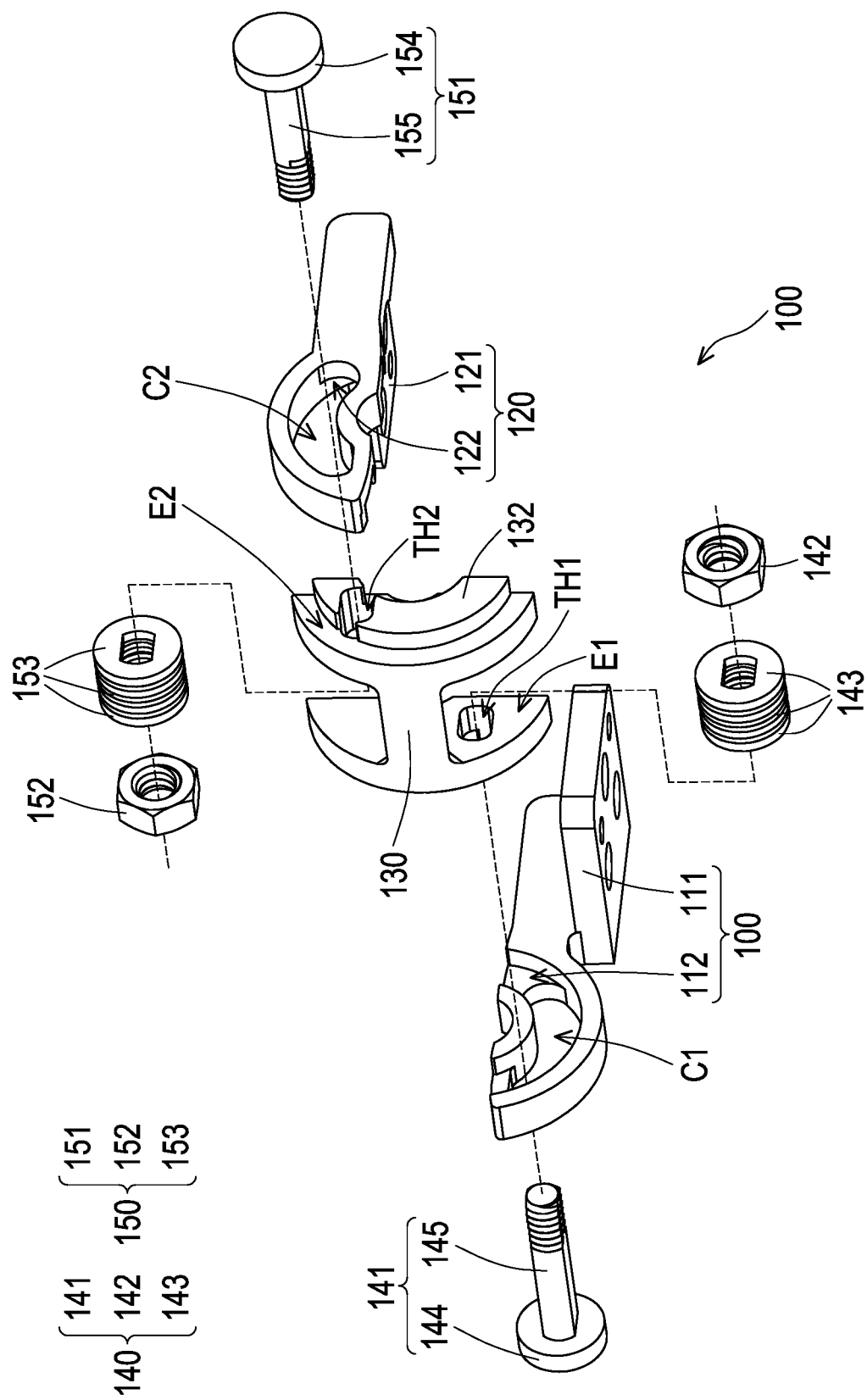

Referring to FIGS. 6A and 6B, the first torsion assembly 140 includes a first locking member 141, a second locking member 142, and multiple torsion members 143. The first locking member 141 includes a head portion 144 and a locking portion 145 that are connected to each other. The second locking member 142 is locked to the locking portion 145, and the torsion members 143 sleeved on the locking portion 145 are clamped between the head portion 144 and the second locking member 142. The locking portion 145 passes through the first arc-shaped slide rail C1 and a first through hole TH1 of the first end E1 to clamp the first bracket 110 and the third bracket 130 between the head portion 144 and the second locking member 142.

The second torsion assembly 150 includes a third locking member 151, a fourth locking member 152, and multiple torsion members 153. The third locking member 151 includes a head portion 154 and a locking portion 155 that are connected to each other. The fourth locking member 152 is locked to the locking portion 155, and the torsion members 153 sleeved on the locking portion 155 are clamped between the head portion 154 and the second locking member 152. The locking portion 155 passes through the second arc-shaped slide rail C2 and a second through hole TH2 of the second end E2 to clamp the second bracket 120 and the third bracket 130 between the head portion 154 and the second locking member 152.

Referring to FIGS. 3A to 4C, the foldable electronic device 50 further includes a casing assembly 80. The casing assembly 80 includes a first casing 81 and a second casing 82. The first casing 81 covers the second bracket 120 and is connected to the second body 70, the second casing 82 covers the third bracket 130 and is connected to the third bracket 130, and the first casing 81 is adapted to cover the second casing 82.

In an embodiment, as shown in FIGS. 1A and 1B, the first body 60 has a gap 61, so that when the second body 70 is unfolded relative to the first body 60, the casing assembly 80 can extend into the accommodating area AP of the first body 60 through the gap 61. Therefore, the second body 70 can hide the casing assembly 80 when unfolded, which allows the foldable electronic device 50 to present a simple and neat appearance at the second position P2 (FIG. 1C), so as to improve the overall appearance and texture of the electronic device 50.

In an embodiment, as shown in FIGS. 2A to 4C, when the second body 70 is unfolded relative to the first body 60 and rotates from the first position P1 through the intermediate position PC to the second position P2, through the setting that the torsion force of the second torsion assembly 150 is smaller than the torsion force of the first torsion assembly 140, the rotation of the second body 70 can sequentially drive the second bracket 120 to rotate relative to the third bracket 130 along the virtual shaft line AX and the third bracket 130 to rotate relative to the first bracket 110 along the virtual shaft line AX.

That is to say, as shown in FIGS. 3A and 3B, the rotation of the second body 70 first drives the second bracket 120 to rotate relative to the third bracket 130 along the virtual shaft line AX, so that the second torsion assembly 150 slides along the second arc-shaped slide rail C2, and the first casing 81 covers the second casing 82 until the second torsion assembly 150 cannot slide along the second arc-shaped slide rail C2 (i.e., at the intermediate position PC).

At this time, as shown in FIGS. 4B and 4C, the third bracket 130 rotates relative to the first bracket 110 along the virtual shaft line AX, so that the first torsion assembly 140 slides along the first arc-shaped slide rail C1 and the first casing 81 covering the second casing 82 extends into the first body 60 together with the second casing 82 until the second inclined surface SC2 is attached to the first inclined surface SC1 (i.e., at the second position P2).

In this way, through the two-stage rotation of the second bracket 120 relative to the third bracket 130 along the virtual shaft line AX and the third bracket 130 relative to the first bracket 110 along the virtual shaft line AX in the hinge module 100, the volume required by the hinge module 100 during the rotating action can be reduced, the number of parts and the cost of the hinge module 100 can also be relatively simplified, and the accommodating area AP required by the hinge module 100 in the first body 60 is greatly reduced, thereby reducing the overall thickness of the first body 60.

In addition, since the casing assembly 80 is a two-piece assembly that is composed of the first casing 81 and the second casing 82, the first casing 81 connected to the second body 70 can cover the second casing 82 first, and then extends into the first body 60 together with the second casing 82, so that the casing assembly 80 covering the hinge module 100 does not have a gap at the connection with the first body 60 and the second body 70. In this way, not only are external substances prevented from entering the first body 60, the second body 70, and the casing assembly 80 to cause damage to the internal structure, but the hinge module 100 is also prevented from being exposed outside the first body 60, the second body 70, and the casing assembly 80, thereby improving the overall appearance and texture of the foldable electronic device 50.

To sum up, in the foldable electronic device of the disclosure, the hinge module is connected between the first body and the second body, and the virtual shaft line is located between the sides of the first inclined surface and the second inclined surface that are closest to each other, so that when the second body is unfolded to any angle relative to the first body, the size of the gap between the first body and the second body is consistent to present a simple and neat appearance, thereby improving the overall appearance and texture of the foldable electronic device.

In addition, through the two-stage rotation of the second bracket relative to the third bracket along the virtual shaft line and the third bracket relative to the first bracket along the virtual shaft line in the hinge module, the volume required by the hinge module during the rotating action can be reduced, the number of parts and the cost of the hinge module can also be relatively simplified, and the accommodating area required by the hinge module in the first body is greatly reduced, thereby reducing the overall thickness of the foldable electronic device.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. A foldable electronic device, comprising:
   a first body, having an end and a first inclined surface, and the end comprising an accommodating area;
   a second body, having a second inclined surface, a virtual shaft line existing between sides of the first inclined surface and the second inclined surface that are closest to each other, and the second body rotating relative to the first body through the virtual shaft line; and
   a hinge module, comprising:
      a first bracket, adjacent to the first inclined surface, connected to the first body, and located in the accommodating area;
      a second bracket, adjacent to the second inclined surface and connected to the second body; and
      a third bracket, comprising a first end and a second end that are opposite to each other, the first bracket being connected to the first end through a first torsion assembly, and the second bracket being connected to the second end through a second torsion assembly;
   wherein when the second body is unfolded relative to the first body, the second bracket rotates relative to the third bracket along the virtual shaft line, and the third bracket rotates relative to the first bracket along the virtual shaft line.

2. The foldable electronic device according to claim 1, wherein an orthographic projection of the second inclined surface on the first body is located in the accommodating area.

3. The foldable electronic device according to claim 1, further comprising a casing assembly, the casing assembly comprising a first casing and a second casing, the first casing covering the second bracket and being connected to the second body, the second casing covering the third bracket and being connected to the third bracket, and the first casing being adapted to cover the second casing.

4. The foldable electronic device according to claim 3, wherein torsion force of the second torsion assembly is smaller than torsion force of the first torsion assembly, and when the second body is unfolded relative to the first body, rotation of the second body sequentially drives rotation of the second bracket relative to the third bracket and rotation of the third bracket relative to the first bracket, so that the first casing first covers the second casing and then extends into the first body together with the second casing.

5. The foldable electronic device according to claim 3, wherein the first body has a gap, so that the casing assembly extends into the first body through the gap.

6. The foldable electronic device according to claim 1, wherein the first bracket comprises a first sliding portion, the second bracket comprises a second sliding portion, the first end comprises a third sliding portion, and the second end comprises a fourth sliding portion, wherein the first sliding portion and the third sliding portion are slidably disposed with respect to each other along the virtual shaft line, and the second sliding portion and the fourth sliding portion are slidably disposed with respect to each other along the virtual shaft line.

7. The foldable electronic device according to claim 6, wherein the first sliding portion, the second sliding portion, the third sliding portion, and the fourth sliding portion are arc-shaped and concentrically disposed on the virtual shaft line.

8. The foldable electronic device according to claim 6, wherein the first sliding portion has a first arc-shaped slide rail, the second sliding portion has a second arc-shaped slide rail, the first arc-shaped slide rail and the second arc-shaped slide rail are concentrically disposed on the virtual shaft line, the first torsion assembly is slidably disposed on the first arc-shaped slide rail, and the second torsion assembly is slidably disposed on the second arc-shaped slide rail.

9. The foldable electronic device according to claim 8, wherein the first torsion assembly comprises:
- a first locking member, comprising a head portion and a locking portion that are connected to each other;
- a second locking member, locked to the locking portion; and
- at least one torsion member, sleeved on the locking portion and clamped between the head portion and the second locking member, wherein the locking portion passes through the first arc-shaped slide rail and a first through hole of the first end, and the first bracket and the third bracket are clamped between the head portion and the second locking member.

10. The foldable electronic device according to claim 8, wherein the second torsion assembly comprises:
- a third locking member, comprising a head portion and a locking portion that are connected to each other;
- a fourth locking member, locked to the locking portion; and
- at least one torsion member, sleeved on the locking portion and clamped between the head portion and the fourth locking member, wherein the locking portion passes through the second arc-shaped slide rail and a second through hole of the second end, and the second bracket and the third bracket are clamped between the head portion and the fourth locking member.

11. The foldable electronic device according to claim 1, wherein when the second body is closed to the first body, the first inclined surface and the second inclined surface are coplanar.

12. The foldable electronic device according to claim 1, wherein the second body rotates 180 degrees relative to the first body through the virtual shaft line.

\* \* \* \* \*